United States Patent [19]
Perry

[11] Patent Number: 4,723,266
[45] Date of Patent: Feb. 2, 1988

[54] CELLULAR COMMUNICATION SYSTEM SHARING CONTROL CHANNELS BETWEEN CELLS TO REDUCE NUMBER OF CONTROL CHANNELS

[75] Inventor: Fred G. Perry, Lynchburg, Va.

[73] Assignee: General Electric Company, Lynchburg, Va.

[21] Appl. No.: 5,999

[22] Filed: Jan. 21, 1987

[51] Int. Cl.[4] .............................................. H04Q 7/01
[52] U.S. Cl. ....................................... 379/60; 379/63; 455/33
[58] Field of Search ........................ 379/58, 59, 60, 63; 455/33, 59

[56] References Cited

U.S. PATENT DOCUMENTS

| | | |
|---|---|---|
| 3,764,915 | 10/1973 | Cox et al. . |
| 3,898,390 | 8/1975 | Wells et al. . |
| 4,127,744 | 11/1978 | Yoshikawa et al. . |
| 4,144,411 | 3/1979 | Frenkiel . |
| 4,144,412 | 3/1979 | Ito et al. . |
| 4,144,496 | 3/1979 | Cunningham et al. . |
| 4,163,121 | 7/1979 | Yoshikawa et al. ................. 379/59 |
| 4,180,708 | 12/1979 | Yamaguchi et al. ................. 379/60 |
| 4,308,429 | 12/1981 | Kai et al. . |
| 4,435,840 | 3/1984 | Kojima et al. . |
| 4,481,670 | 11/1984 | Freeburg ............................. 455/33 |
| 4,659,878 | 4/1987 | Dinkins ............................... 370/71 |

FOREIGN PATENT DOCUMENTS

AU-B-68
  203/81 3/1981 Australia .
  0036146 3/1981 European Pat. Off. .

OTHER PUBLICATIONS

Appleby et al, "The Cellnet Cellular Radio Network", *British Telecommunications Engineering*, vol. 4, 7/85, pp. 63 & 64.

Mikulski, "Dyna T AC Cellular Portable Radio Telephone System Experience in the U.S. and the U.K.". *I.E.E.E. Communications*, vol. 24, No. 2, 2/86, pp. 42-44.

Data Communication—High Level Data Link Control Procedures—Elements of Procedures, Addendum 1, UDC 681.327.18.01, Ref. No. ISO 4335-1979/Add. 1-1979(E).

EIA Interim Standard, Cellular System Mobile Station-Land Station, Capatibility Specification IS-3-B (Rev. of CIS-3-A) Jul. 1984.

*Primary Examiner*—Robert Lev
*Attorney, Agent, or Firm*—Nixon & Vanderhye

[57] ABSTRACT

Unnecessary control channels are eliminated in a mature cellular radio telephone RF communications system by sharing control channel transceivers and control channels between original omni-directional cells and subdivisions of those original cells. A control channel is allocated to the original omni-directional cell, and subdivided cell areas are not provided with their own control channels. One or more voice channels are allocated to the original omni-directional cell, and the subdivided cell areas also have voice channels allocated to them. Calls are initiated between mobile transceivers and the original omni-directional cell. Locating receivers associated with the subdivided cell areas determine which subdivisions particular mobile transceivers are located within. Subsequently, calls are handed off fron the original omni cell to an appropriate subdivision.

19 Claims, 3 Drawing Figures

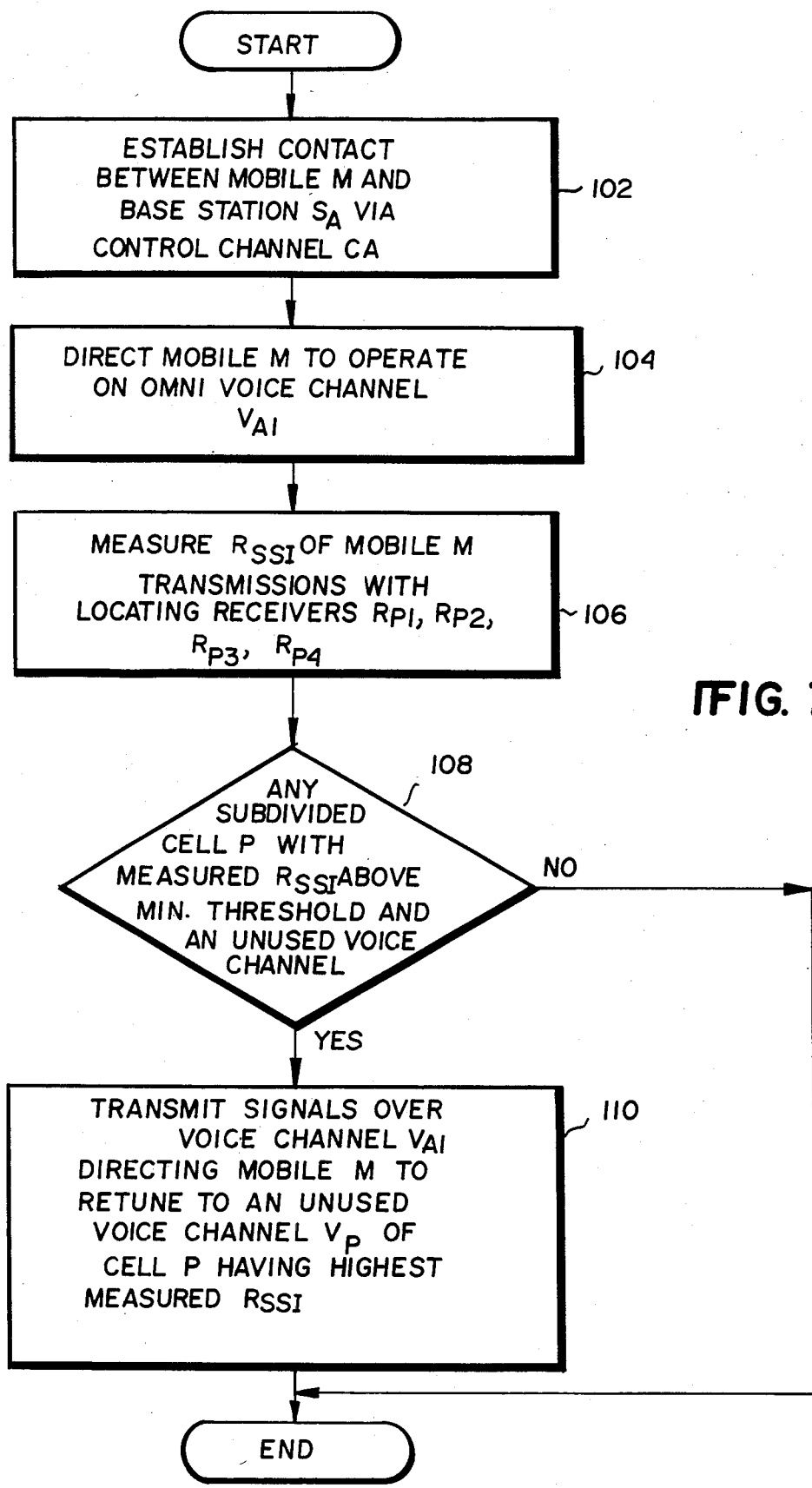

CELLULAR COMMUNICATION SYSTEM SHARING CONTROL CHANNELS BETWEEN CELLS TO REDUCE NUMBER OF CONTROL CHANNELS

BACKGROUND OF THE INVENTION

In a cellular radio communications system, the desired radio coverage area is divided into a number of smaller geographical areas called cells. Initially, when subscriber density is low, it is desirable for economic reasons to serve the area with as few cells as possible. The size of the initial cells is limited in the United States by rules of the Federal Communications Commission (FCC) concerning radiated power in relation to antenna height.

The initial cells are typically provided with one or more antennas each of which have a radiation pattern which covers the entire cell. Such cells may be called omni-directional because, in normal terrain, the antenna pattern will usually be non-directional in order to cover the largest area with the least amount of equipment. However, the significant point is not the directionality of the antenna but the fact that the antenna pattern covers the entire cell. Typically, an antenna combining arrangement is provided so that a number of RF (radio frequency) channel assignments may use each antenna.

The basic feature of cellular systems is that by carefully locating cells and assigning channels to cells, the available frequencies may be reused many times throughout the system—thereby promoting efficient use of the radio spectrum. The number of channels which may be assigned to a cell is limited by the FCC allocation of frequencies to the cellular radio telephone communications service and by interference considerations relating to cell geometry, frequency reuse, etc. Thus, there is an upper bound on both cell size and the number of channels which may be assigned to a cell. These limits determine the number of subscribers which may be served by a system having omni-directional cells.

The channels assigned to a cell include voice channels (used for conversations) and control channels (used to establish contact with mobile transceivers and to direct the mobiles to operate on specific voice channels). Although a control channel must be available to every cell in order to permit the cell to "set up" communications with mobile transceivers, control channels carry no conversations and may be considered to be an overhead expense which it is desirable to minimize.

Cellular systems also have receivers (usually called locating receivers) which are capable of measuring the signal strength of the RF signals received from the mobile transceivers. When a mobile transceiver travels between cells, the signal strength is measured to determine which cell coverage area may best serve the mobile. The mobile transceiver is given a command to retune to a new channel in the new cell when a cell other than the one serving it can provide better service. This process is called handoff.

As the number of subscribers using a cellular system increases, a point is reached at which cells handling heavy traffic no longer have sufficient voice channels to handle the traffic during peak usage times. This problem is solved by subdividing a (large omni) cell coverage area into smaller areas. The use of smaller coverage areas allows frequencies to be reused in closer proximity to each other and thus provides more channels in the same overall area. A number of different arrangements have been proposed for subdividing initial large omni-directional cells. Three basic patterns have evolved. Cell splitting, cell sectoring, and cell overlaying.

In cell splitting, one or more new, smaller cells are added between existing cells. Typically, the existing cells must be made smaller and the channel use patterns must be altered to accommodate the new cells. The net effect is that the original coverage area is subdivided into (mostly smaller) areas which may or may not overlap.

In cell sectoring, directional antennas are used to divide the original cell into smaller areas defined by the directional patterns of the antennas.

The technique of overlaying cells provides a smaller cell at the original cell site. The smaller cell may use the same antenna as the original large omni-directional cell, but the mobile service area is limited by some combination of reduced RF power (mobile, base, or both) and handoff boundaries determined by decisions based on signal strength measurements.

Combinations of these three arrangements have also been proposed.

In all of these arrangements, the subdivided cells must be provided with control channels to permit mobile transceivers to access the subdivided cells. In the sectored and cell splitting arrangements, at least one control channel is provided for each subdivision of the original cell.

The reason each subdivided cell is provided with its own control channel is that idle mobile transceivers "self-locate" by automatically tuning to the control channel received at the strongest signal strength (typically, the control channel signal received at the highest amplitude by the mobile is transmitted by the cell in which the mobile is located). When communications is to be established with the mobile, the mobile is already monitoring the control channel of the appropriate cell and is simply directed to tune to a voice channel of that cell.

Thus, these existing arrangements cause a proliferation of control channels which, as noted above, constitute overhead (i.e., require additional equipment and use additional RF channels which might otherwise be used to carry extra calls) which should be minimized if possible.

SUMMARY OF THE INVENTION

My invention provides a new cellular radio system arrangement in which unnecessary control channels are eliminated. One exemplary system arrangement in accordance with my invention has the following features.

A control channel is allocated to the original omni-directional cell.

One or more voice channels are allocated to the original omni-directional cell.

The subdivided cell area is not provided with its own control channel.

The subdivided cell area is provided with its own locating receiver.

Calls are "set up" in the original omni-directional cell. Call progress is allowed to continue until the call is being handled by a voice channel transceiver allocated to the omni-directional cell.

Locating receiver measurements are then made in the subdivided cell(s) to determine which of the subdivided cell areas may best serve the mobile.

The mobile transceiver is directed to tune to a voice channel in one of the subdivided cell areas. The messaging procedure to the mobile transceiver is the same as for a conventional hand off.

Thereafter, the call continues using the usual procedures available for cellular call progress control (handoff, release, etc.).

My new invention provides the following advantages.

- No control channels are allocated to subdivided cells. In particular, sectored cells do not require a control channel in each sector. For a 120 degree sector plan, this saves three control channels per sectored cell. For a 60 degree plan this saves six control channels per sectored cell. In cell splitting, the savings is equal to the number of new small cells added.
- System requirements for control ports to operate control channels are reduced. Thus, a cell site controller of a specific size and capability may operate more voice channels.

The advantages of my new arrangement can be enhanced if the number of voice channels retained in the omni-directional cell is made large enough to allow the omni-directional cell to handle additional traffic. This provides for:

- A greater number of simultaneous calls in progress.
- Greater trunking efficiency by providing larger trunk groups than can be provided in the subdivided cells by themselves. (This provides for more subscribers by allowing each voice channel to handle more traffic.)
- Flexibility in handling non-uniform distributions of peak loads. (Traffic from an overloaded subdivision can be handled by channels in the omni-directional cell.)

In sectored systems, the voice channels used omni-directionally in one cell may be used directionally in outlying cells and vice versa. This may allow for reuse in closer proximity than is possible for a strictly omni-directional arrangement and thus allows for greater reuse of frequencies.

BRIEF DESCRIPTION OF THE DRAWINGS

These and other features and advantages of the present invention may be better and more completely understood by referring to the following detailed description of a presently preferred embodiment in conjunction with the appended sheets of drawings, of which:

FIG. 3 is a flowchart of exemplary program control steps performed by fixed station $S_A$ of the present invention to establish communications with a mobile transceiver M.

DETAILED DESCRIPTION OF A PREFERRED EMBODIMENT

Figure 1:
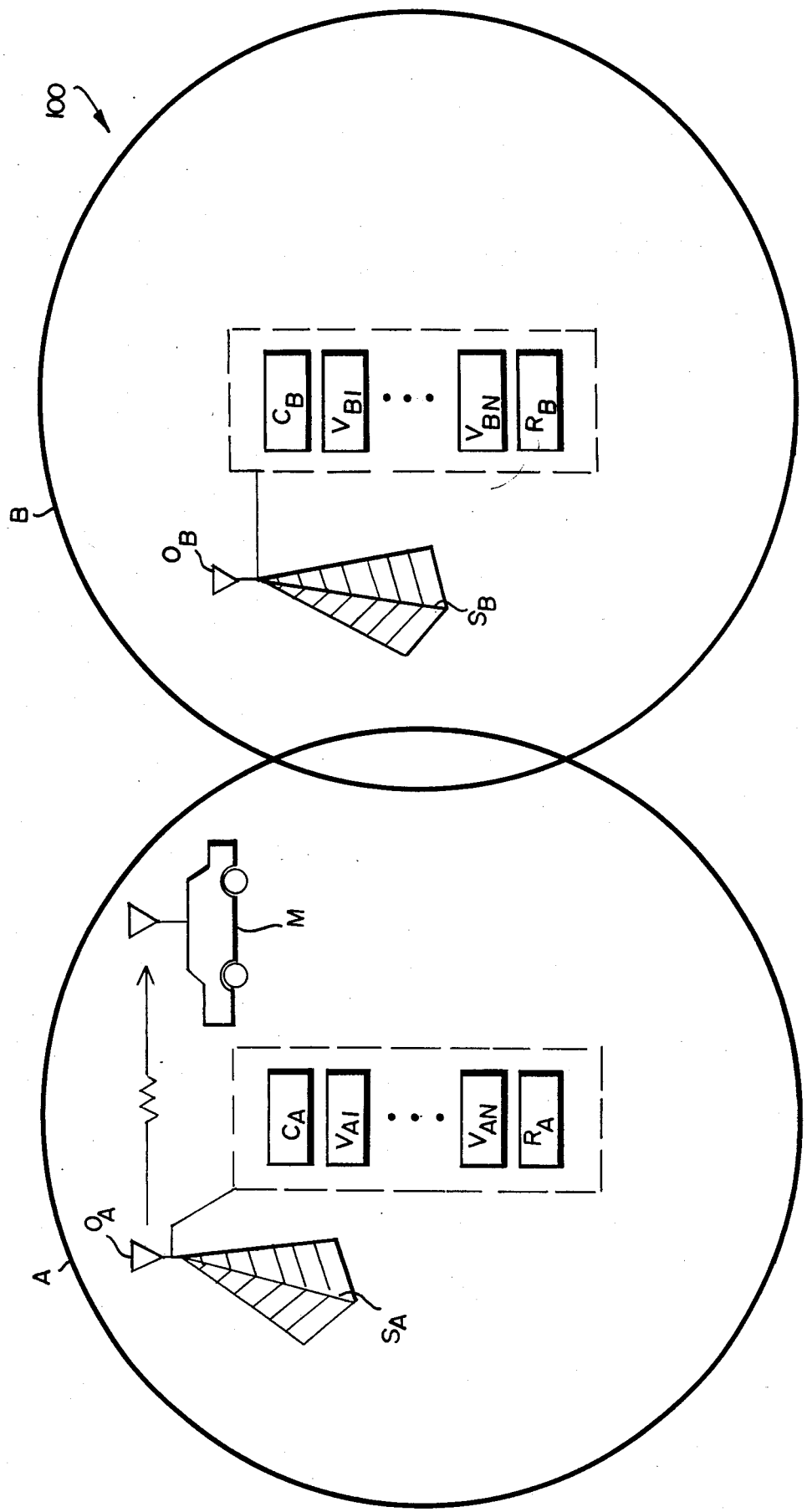
FIG. 1 is a schematic diagram of a simplified initial two-cell cellular radiotelephone communications system 100.

FIG. 1 shows a simplified two-cell cellular radiotelephone communications system 100 of the type which might be initially established in an area where cellular radio service was not previously available.

System 100 includes omni-directional cells A and B served by fixed stations $S_A$ and $S_B$, respectively. Fixed stations $S_A$ and $S_B$ (which are typically located near the geographical center of their respective cells) each include a control channel RF transceiver C, at least one (and typically several) voice channel RF transceivers V, a locating RF receiver R, and an omni-directional antenna O.

The voice channel transceivers are used to communicate voice signals (e.g., conversations) with mobile transceivers M. The voice channel transceivers V of a fixed station S operate on different radio frequencies (or pairs of frequencies for duplex operation) so that all of those voice channels can be used simultaneously without interfering with one another (as is well known).

The maximum number of mobile transceivers a fixed station can provide service to is thus equal to the number of voice channel transceivers the fixed station is provided with. For example, fixed station $S_A$ is equipped with N voice transceivers ($V_{A1}$-$V_{AN}$), and may therefore simultaneously serve N mobile transceivers M within cell A.

Control channel transceivers C are used to exchange control information with mobile transceivers M. A mobile transceiver M typically requires control information only occasionally (e.g., to initially establish communications between the mobile transceiver and a voice channel transceiver V). Therefore, a single control channel transceiver C is usually sufficient to handle control signal traffic for all mobile transceivers within a cell. For example, during cell set-up, cell A control transceiver $C_A$ receives control information from and transmits control information to mobile transceivers M operating within cell A.

Locating receivers R provide signal strength measurements (sometimes called "Received Signal Strength Indicators" or RSSIs) of signals transmitted by mobile transceivers M. Such RSSI measurements are used by cellular system 100 to determine which fixed station S (i.e., which cell) can best serve particular mobile transceivers M. Each locating receiver R is tunable to any voice channel used in system 100 (and is thus operable on frequencies other than those used by voice channel transceivers V associated with the same cell as is the locating receiver). Locating receivers R perform measurements on demand, and therefore, each fixed station S generally requires only a single locating receiver R to perform all RSSI measurements for that cell. For example, locating receiver $R_A$ performs all RSSI measurements for cell A.

Assume a mobile transceiver M within cell A requires service. Mobile transceiver M is already monitoring the signal transmitted by control channel transceiver $C_A$ (since it receives that control channel transmission at the highest signal strength). Control signals are exchanged between mobile transceiver M and control channel transceiver $C_A$ which direct the mobile to retune to one of voice channels $V_{A1}$-$V_{AN}$. Communications then occurs on the voice channel.

As mentioned previously, fixed station $S_A$ can simultaneously handle only N calls (as limited by the N voice channel transceivers $V_{A1}$-$V_{AN}$ the fixed station is equipped with). As cellular communications becomes more popular in the area served by system 100 and more people subscribe to use the system, there will come a time when all of voice channel transceivers $V_{A1}$-$V_{AN}$ are in use much of the time. For example, if cell A covers a downtown metropolitan area, it may be virtually impossible during morning and evening rush hours to establish communications with fixed station $S_A$—because all of voice channel transceivers $V_{A1}$-$V_{AN}$ are already in use and there are many more than N mobile transceivers that need to be served by cell A simultaneously.

Figure 2:
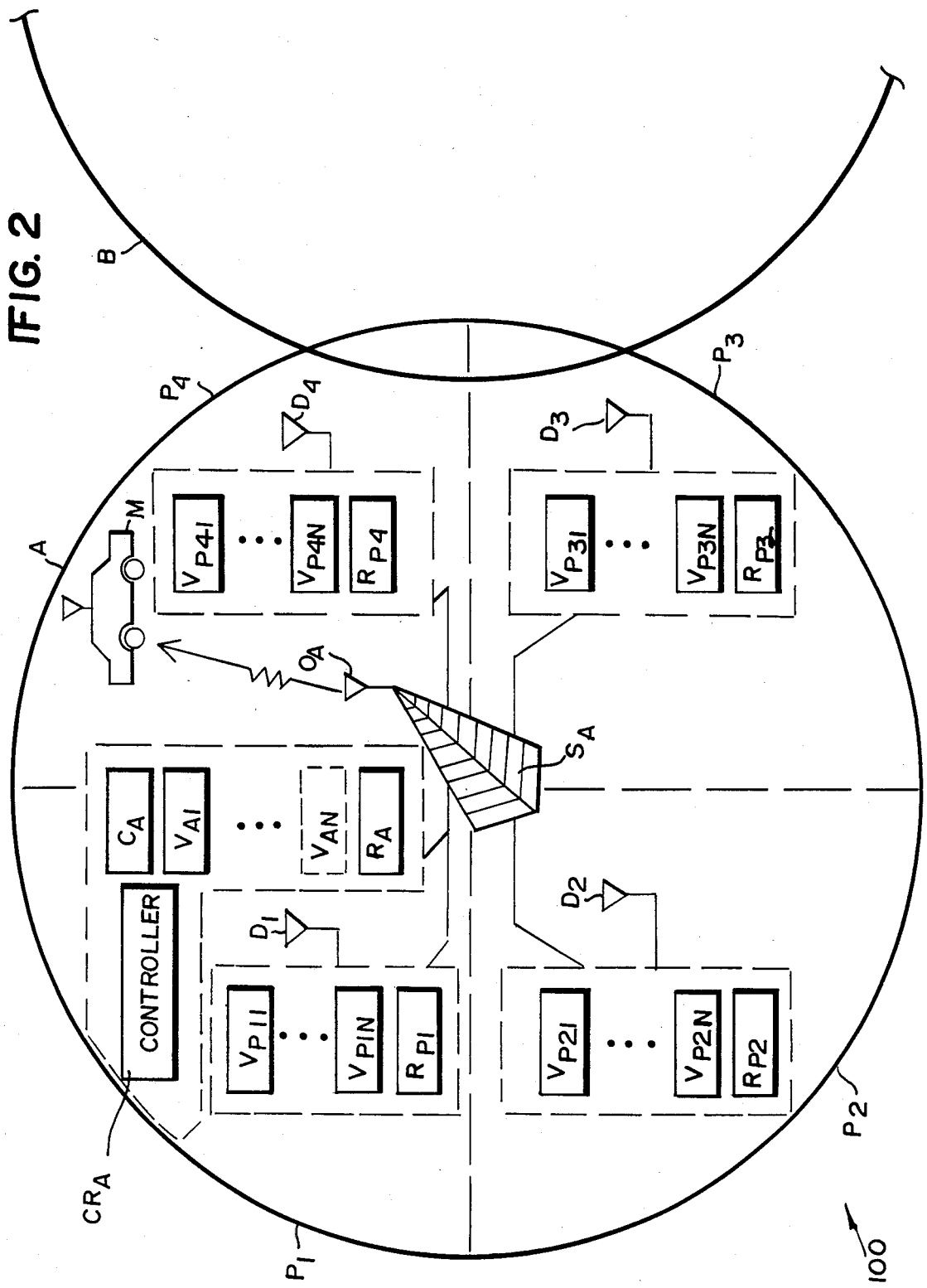
FIG. 2 is a schematic diagram of the system 100 shown in FIG. 1 wherein cell A has been subdivided into new cells P1, P2, P3 and P4 and the subdivided cells are served by a fixed station $S_A$ of the present invention.

FIG. 2 shows a more "mature" version of cellular system 100 which has been modified to accommodate higher traffic levels within cell A (or for other reasons, e.g., interference control). Cell A has been subdivided into several sub-cells P1, P2, P3 and P4. Cell subdivision can be accomplished by overlaying the new cells onto existing cell A, sectoring cell A using directional antennas, splitting the cell into two or more smaller cells, etc.

For purposes of illustration, cell A has been subdivided into four 90° pie-shaped sectors P1-P4 each located within cell A and served by respective directional antennas D1-D4 located at the fixed station $S_A$ cell site. However, the present invention can be used with any type of cell subdivision technique which yields subdivisions disposed substantially within the original cell A (or at least within the range of the control channel transceiver $C_A$ of the original cell).

Transceiving equipment at the site of fixed station $S_A$ is modified to accomplish subdivision of cell A. In accordance with the present invention, voice channel transceivers $V_P$, locating receivers $R_P$, and associated directional antennas D serve subdivisions P1-P4.

In addition, control channel transceiver $C_A$, at least one voice channel transceiver $V_{A1}$, and omni-directional antenna $O_A$ are left in place to serve mobile transceivers M located anywhere within original cell A. The frequency voice channel transceiver $V_{A1}$ operates on is selected so that it can operate simultaneously with any or all of the voice channel transceivers $V_P$ without interference resulting.

In the past, each of subdivided cells P1-P4 would have been provided with its own control channel transceiver C, and the new subdivided cells would operate as virtually independent cells (depending upon the type of subdivisions created, original omni-directional cell A might have been completely eliminated). In contrast, the present invention shares control channel transceiver $C_A$ between original cell A and subdivided cells P1-P4. This common control channel transceiver $C_A$ is used to "set-up" calls with mobile transceivers M anywhere within cell A.

A two-step process is provided by the present invention to establish communications between a mobile transceiver M and a voice channel transceiver $V_P$ associated with one of subdivisions P1-P4. First, the mobile transceiver is directed via control channel $C_A$ to operate on the voice channel $V_A$ allocated to original cell A. Then, the ongoing communication so established is transferred (handed off) to a voice channel transceiver $V_P$ associated with an appropriate subdivision cell P. The "appropriate" subdivision cell is determined by measuring the amplitudes of signals transmitted by mobile transceiver M with locating receivers $R_P$.

FIG. 3 is a flowchart of exemplary program control steps executed by a digital signal processor(s) controlling fixed station $S_A$ (e.g., a cell site controller $CR_A$ located at fixed station $S_A$, or an MTX computer controlling all of cellular system 100).

The program control steps shown in FIG. 3 establish communications between a mobile transceiver M and a voice channel transceiver $V_P$ associated with one of subdivided cells P. For purposes of explanation, assume that mobile transceiver M is located in subdivision P4 and that voice channel transceivers $V_{A1}$ and $V_{P41}$ are not busy.

Mobile transceiver M automatically initially tunes to and listens on the control channel allocated to channel transceiver $C_A$. A control communications link is thus established between mobile M and fixed station $S_A$ via that control channel transceiver (block 102). For example, mobile transceiver M may automatically tune to the transmitted control channel signals it receives at the highest signal strength level.

Fixed station $S_A$ and mobile transceiver M then exchange control signals (e.g., conventional handshaking and protocol signals as specified by EIA specification IS3B) over the control channel via control channel transceiver $C_A$ to direct the mobile transceiver to begin operating on free voice channel transceiver $V_{A1}$ (block 104). A conversation begins by exchanging voice signals between mobile transceiver M and voice channel transceiver $V_{A1}$.

Fixed station $S_A$ then determines which of subdivisions P1-P4 mobile transceiver M is located within by controlling locating receivers $R_{P1}$, $R_{P2}$, $R_{P3}$ and $R_{P4}$ to each measure the amplitude of signals transmitted by the mobile transceiver (block 106). The subdivision (e.g., P4) associated with the locating receiver $R_P$ receiving the highest RSSI is determined to be the subdivision within which the mobile transceiver is located.

Fixed station $S_A$ then determines whether the subdivision in which mobile transceiver M is located has any free voice channel transceivers (e.g., by checking whether any of voice channel transceivers $V_{P41}$-$V_{P4N}$ are not in use)—and also checks whether the RSSI measured by the locating receiver $R_P$ associated with that subdivision exceeds a minimum threshold level needed to maintain high-quality communications (block 108). If, for example, locating receiver $R_{P4}$ measures an RSSI level which is greater than the levels measured by $R_{P1}$, $R_{P2}$ and $R_{P3}$ and which also exceeds the minimum threshold level, and at least one of voice channel transceivers $V_{P41}$-$V_{P4N}$ (for example, $V_{P41}$) is not busy, conventional handoff signalling protocol is transmitted by voice channel transceiver $V_{A1}$ to direct mobile transceiver M to cease communicating with voice channel transceiver $V_{A1}$ and to begin communicating with voice channel transceiver $V_{P41}$ (block 110).

Even if all of the voice channel transceivers $V_P$ associated with the subdivision in which mobile transceiver M is located are in use, it is possible that a voice channel transceiver associated with some other subdivision may be able to provide adequate service. Blocks 108 and 110 cause the mobile transceiver call to be handed off to some free subdivision voice channel transceiver $V_P$ capable of providing adequate service if one exists.

Although only one voice channel transceiver $V_A$ having the coverage area of original cell A is needed to practice the invention, additional voice channel transceivers associated with cell A may be retained to allow cell A to handle overload traffic when voice channel transceivers $V_P$ associated with subdivisions P are busy. Preferably, at least one voice channel transceiver $V_A$ (associated with cell A) is always free so that new calls can be initiated. However, a greater number of simultaneous calls in progress, greater trunking efficiency, and additional flexibility in handling non-uniform loading of subdivisions P can be provided if fixed station $S_A$ is equipped with more than the minimum number of voice channel transceivers $V_A$ needed to temporarily accept new calls and maintain communications while the new calls are being transferred to subdivisions P.

While the present invention has been described with what is presently considered to be the most practical and preferred embodiments, it is to be understood that the appended claims are not be limited to the disclosed embodiments but on the contrary, are intended to cover all modifications, variations and equivalent arrangements which retain any of the novel features and advantages of this invention.

What is claimed is:

1. Apparatus for maintaining control over mobile cellular radio transceivers in a sub-divided cell environment, said apparatus including:
   a single shared control channel transceiving means for using a single shared control channel to transceive control signals to mobile transceivers in each of plural sub-divided cells; and
   plural discrete locating receivers, a different receiver being used for each of said sub-divided cells.

2. A cellular radio communications system including:
   first fixed RF transceiving means for communicating RF signals with mobile RF transceivers located within a first geographical area over a first RF communication channel;
   second fixed RF transceiving means for communicating RF signals with mobile RF transceivers located within a second geographical area different from said first area over a second RF communication channel different from said first channel; and
   a single fixed RF control signal transmitting means shared by said first and second areas for transmitting RF control signals so as to control said mobile RF transceivers within both said first and second geographical areas.

3. A system as in claim 2 wherein said second area is contained within said first area.

4. A system as in claim 3 wherein the coverage of said control signal transmitting means is substantially equal to the coverage of said first transceiving means.

5. Apparatus for establishing radio communications with a mobile radio transceiver located within a first cell area and also within a smaller area located substantially within said first area, said apparatus comprising:
   first RF transceiving means for communicating RF signals over a control channel associated with said first cell area;
   further RF transceiving means for communicating RF signals over a voice channel associated with said first cell area;
   directional RF transceiving means for communicating RF signals over a further voice channel associated with said smaller cell area;
   locating means for determining whether said mobile transceiver is located within said smaller area; and
   control means connected to said first and further RF transceiving means, said directional RF transceiving means, and said locating means, for: (a) controlling said first RF transceiving means to transmit RF signals over said control channel directing said mobile transceiver to tune to said first-mentioned voice channel, and subsequently for (b) controlling said further RF transceiving means to transmit RF signals over said voice channel directing said mobile transceiver to retune to the further voice channel associated with the smaller cell area if said locating means determines said mobile transceiver is located within said smaller area.

6. Apparatus as in claim 5 wherein said locating means includes directional RF locating receiver means, associated with said smaller areas, for determining the location of said mobile transceiver in response to the received amplitude of signals transmitted by said mobile transceiver.

7. A cellular radio frequency communications fixed transceiving station of the type which communicates with a tunable mobile RF transceiver, said station including:
   first RF transceiving means for communicating RF signals with mobile RF transceivers located within a first geographical area over a first RF communication channel;
   second RF transceiving means for communicating RF signals with mobile RF transceivers located within a second geographical area contained within said first area over a second RF communication channel different from said first channel;
   RF control signal transmitting means shared by said first and second areas for transmitting RF control signals to mobile RF transceivers located anywhere within said first area and to mobile RF transceivers located anywhere within said second area; and
   controller means connected to said first and second transceiving means and to said control signal transmitting means and programmed to perform the following functions:
   (1) control said control signal transmitting means to transmit control signals directing a predetermined mobile transceiver located within said second area to tune to said first RF channel,
   (2) control said first RF transceiving means to communicate RF signals with said mobile transceiver over said first channel, said RF signals including control signals directing said mobile transceiver to retune to said second RF channel, and
   (3) control said second RF transceiving means to communicate RF signals with said predetermined mobile transceiver over said second RF channel.

8. A cellular radio RF transceiving station including:
   first RF transceiving means for communicating RF signals with mobile RF transceivers located within a first predefined geographical area over a first radio frequency communications channel;
   second RF transceiving means for communicating RF signals with mobile RF transceivers located within a second predefined geographical area smaller than and contained within said first area over a second radio frequency communications channel different from said first channel;
   RF locating receiver means for measuring the amplitudes of RF signals transmitted by mobile RF transceivers located within said second area; and
   control signal generating means connected to said RF locating receiver means and said first and second RF transceiving means for controlling said first RF transceiving means to transmit RF control signals over said first radio frequency communications channel directing a mobile RF transceiver within said second area to tune from said first radio frequency communications channel to said second radio frequency communications channel in response to said measured amplitudes.

9. A cellular radio RF transceiving station including:

first RF transceiving means for transmitting RF signals to and receiving RF signals transmitted by mobile RF transceivers located within a first geographical area over a first radio frequency communications channel;

first RF locating receiver means for measuring the amplitude of RF signals transmitted by mobile RF transceivers located within said first area;

second RF transceiving means for transmitting RF signals to and receiving RF signals transmitted by mobile RF transceivers located within a second geographical area larger than and including said first area over a second radio frequency communications channel different from said first channel;

RF control signal transmitting means shared between said first and second areas for transmitting RF control signals over a radio frequency control channel to mobile RF transceivers located within said second area; and controller means, connected to said first and second transceiving means, said locating receiver means and said transmitting means, for:
controlling said control signal transmitting means to transmit RF control signals over said control channel directing a mobile transceiver located within said second area to communicate RF signals with said second RF transceiving means over said second channel,
controlling said locating receiver means to measure the amplitude of RF signals transmitted by said mobile transceiver,
testing said measured amplitude, and
if said testing reveals said mobile transceiver is within said first area, controlling said second RF transceiving means to transmit RF control signals over said second RF channel directing said mobile transceiver to cease communicating RF signals with said second transceiving means and to begin communicating RF signals with said first transceiving means over said first channel.

10. A cellular radio RF transceiving station including:
first RF transceiving means for transmitting RF signals to and receiving RF signals transmitted by mobile RF transceivers located within a first geographical area over a first radio frequency communications channel;

first RF locating receiver means for measuring the amplitude of RF signals transmitted by mobile RF transceivers;

second RF transceiving means for transmitting RF signals to and receiving RF signals transmitted by mobile RF transceivers located within a second geographical area larger than and including said first area over a second radio frequency communications channel different from said first channel;

RF control signal transmitting means shared between said first and second areas for transmitting RF control signals over a radio frequency control channel to mobile RF transceivers located within said first area and to mobile RF transceivers located within said second area; and controller means, connected to said first and second transceiving means, said locating receiver means and said transmitting means, for:
setting up a call by controlling said control signal transmitting means to transmit RF control signals over said control channel, said control signals directing a mobile transceiver located within said first area to communicate RF signals with said second transceiving means over said second channel,
controlling said locating receiver means to measure the amplitude of RF signals transmitted by said mobile transceiver,
testing said measured amplitude, and
if said testing reveals said mobile transceiver is within said first area, handing off said call by controlling said second transceiving means to transmit RF control signals over said second channel directing said mobile transceiver to cease communicating RF signals with said second transceiving means and to begin communicating RF signals with said first transceiving means over said first channel.

11. A method for maintaining control over mobile cellular radio transceivers in a sub-divided cell environment, said method comprising the steps of:
using a single shared control channel for communicating control signals to mobile units in each of plural sub-divided cells; and
using a separate locating receiver for determining which of said sub-divided cells mobile transceivers are located within.

12. A process for establishing radio communications with a mobile radio transceiver located within a first cell area and also within a smaller area located substantially within said first area, said process comprising:
(a) transmitting signals with a base transceiver over a control channel associated with said first cell area;
(b) tuning to and monitoring said control channel with said mobile transceiver;
(c) communicating further signals between said base transceiver and said mobile transceiver over said control channel;
(d) retuning said mobile transceiver to a voice channel associated with said first cell area in response to said further signals;
(e) determining if the mobile transceiver is located within said smaller area; and
(f) if said determining step reveals said mobile transceiver is located within said smaller area, retuning said mobile transceiver to a further voice channel associated with said smaller area.

13. A process as in claim 12 wherein said determining step (e) includes the step of measuring the amplitude of signals transmitted by said mobile transceiver with a locating receiver associated with said smaller area.

14. A process as in claim 12 wherein said retuning step includes:
(1) transmitting control signals from said base transceiver to said mobile transceiver over said first-mentioned voice channel, said control signals specifying said further voice channel; and
(2) retuning said mobile transceiver to operate on said further voice channel in response to said control signals transmitted by said transmitting step (1).

15. In a cellular radio communications system, a method of establishing communications with a mobile radio transceiver comprising the steps of:
(1) transmitting first RF control signals over a first predefined coverage area via a RF control channel, said control signals directing said mobile transceiver to tune to a first RF communication channel in response thereto;

(2) receiving RF signals transmitted by said mobile transceiver over said first communication channel with a first transceiver having said first coverage area;

(3) determining, in response to the amplitude of said received signals, whether said mobile transceiver is located within a predefined further coverage area smaller than and contained within said first coverage area; and (4) if said determining step reveals said mobile transceiver is located within said further coverage area, performing the following steps:

(a) transmitting further RF control signals directing said mobile transceiver to retune to a further RF communication channel different from said first channel, and (b) transmitting RF signals to said mobile transceiver over said further channel with a further transceiver having said further coverage area.

16. In a cellular radio communications system, a method of controlling the operation of a mobile radio transceiver comprising the steps of:

(1) monitoring the one of plural RF control channels carrying signals with the highest received amplitude;

(2) receiving first RF control signals present on said control channel;

(3) tuning to a first RF communication channel in response to said first control signals;

(4) transmitting RF signals over said first channel to a first fixed transceiver having a first predefined coverage area and/or receiving RF signals transmitted by said first transceiver over said first channel;

(5) receiving further RF control signals present on said first channel if said mobile transceiver is located within a further coverage area smaller than and within said first coverage area;

(6) retuning to a further RF communication channel different from said first channel in response to said received further control signals; and (7) subsequently to said retuning step (6), transmitting RF signals over said further channel to a further fixed transceiver having said further coverage area and/or receiving RF signals transmitted by said further transceiver over said second channel.

17. In a cellular radio communications system, a method of establishing communications with a mobile radio transceiver comprising the steps of:

(1) monitoring a first RF control channel with said mobile transceiver;

(2) transmitting first RF control signals over said control channel with a RF control channel transmitter having a first coverage area;

(3) tuning said mobile transceiver to a first RF communication channel in response to said first control signals;

(4) transmitting RF signals to said mobile transceiver over said first channel with a first transmitter having approximately said first coverage area;

(5) determining whether said mobile transceiver is located within a predefined further coverage area smaller than and contained within said first coverage area; and (6) if said determining step reveals said mobile transceiver is located within said further coverage area, performing the following steps:

(a) transmitting further RF control signals over said first RF communication channel, (b) tuning said mobile transceiver to a further RF communication channel different from said first channel in response to said further control signals, and (c) transmitting RF signals to said mobile transceiver over said further channel with a further transmitter having said further coverage area.

18. A method of subdividing an omni-directional cell of a cellular radio system, said cell being served by a RF transceiving station, said transceiving station including first RF transceiving means and an associated omni-directional RF antenna for communicating RF signals over a first RF communications channel with mobile RF transceivers located within said omni-directional cell and further including RF control signal transmitting means connected to the same or different omni-directional RF antenna for transmitting RF control signals over a radio frequency control channel to mobile RF transceivers within said cell, said method comprising:

providing a second RF transceiving means and associated directional RF antenna for communicating RF signals with mobile RF transceivers located within a predefined geographical subdivision of said cell smaller than and substantially contained within said cell, said second transceiving means operating on a second radio frequency communications channel different from said first channel;

providing a RF locating receiver means connected to said directional RF antenna for determining whether mobile RF transceivers are located within said subdivision; and sharing said control signal transmitting means between mobile transceivers within said cell and mobile transceivers within said subdivision.

19. In a cellular radio communications system, a method of establishing communications with a mobile radio transceiver comprising the steps of:

(1) transmitting first RF control signals over a RF control channel;

(2) tuning said mobile transceiver to transmit RF signals over a first RF communication channel in response to said first control signals;

(3) receiving said RF signals transmitted by said mobile transceiver over said first communications channel;

(4) transmitting RF signals to said mobile transceiver over said first channel with a first transmitter having a predefined first coverage area;

(5) determining, in response to the amplitude of said received signals, whether said mobile transceiver is located within a predefined further coverage area smaller than and contained within said first coverage area; and (6) if said determining step reveals said mobile transceiver is located within said further coverage area, transmitting further RF control signals to said mobile transceiver, retuning said mobile transceiver to transmit RF signals over a further RF communication channel different from said first channel in response to said further control signals, and transmitting RF signals to said mobile transceiver over said further channel with a further transmitter having said further coverage area.

* * * * *